US010677075B2

(12) United States Patent
Weaver

(10) Patent No.: US 10,677,075 B2
(45) Date of Patent: Jun. 9, 2020

(54) COMPOSITE AIRFOIL ASSEMBLY FOR AN INTERDIGITATED ROTOR

(71) Applicant: General Electric Company, Schenectady, NY (US)

(72) Inventor: Matthew Mark Weaver, Loveland, OH (US)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 15/971,281

(22) Filed: May 4, 2018

(65) Prior Publication Data
US 2019/0338656 A1 Nov. 7, 2019

(51) Int. Cl.
*F01D 5/30* (2006.01)
*F01D 5/28* (2006.01)
*F01D 5/14* (2006.01)

(52) U.S. Cl.
CPC .......... *F01D 5/3053* (2013.01); *F01D 5/147* (2013.01); *F01D 5/282* (2013.01); *F01D 5/303* (2013.01); *F05D 2230/31* (2013.01); *F05D 2300/6033* (2013.01)

(58) Field of Classification Search
CPC ........ F01D 5/147; F01D 5/282; F01D 5/3053; F01D 5/303; F02C 3/067
See application file for complete search history.

(56) References Cited

U.S. PATENT DOCUMENTS

| | | | | |
|---|---|---|---|---|
| 3,235,346 A | | 2/1966 | Hucke | |
| 3,487,879 A | * | 1/1970 | McCarthy | F04D 29/324 416/220 R |
| 4,037,990 A | * | 7/1977 | Harris | F01D 5/3053 416/220 R |
| 5,017,092 A | * | 5/1991 | Violette | B64C 11/06 416/204 A |
| 5,163,817 A | | 11/1992 | Violette et al. | |
| 5,198,282 A | | 3/1993 | Baker et al. | |
| 5,314,307 A | | 5/1994 | Farmer | |

(Continued)

FOREIGN PATENT DOCUMENTS

EP   2108785 A2   10/2009

OTHER PUBLICATIONS

U.S. Appl. No. 15/632,739, filed Jun. 26, 2017.

*Primary Examiner* — Ninh H. Nguyen
(74) *Attorney, Agent, or Firm* — Dority & Manning, P.A.

(57) ABSTRACT

Rotor assemblies and methods for manufacturing airfoils for rotor assemblies are provided. For example, a rotor assembly comprises a rotary structure extending circumferentially about an axial centerline of a gas turbine engine, an airfoil having a root and a tip, and a pin extending through the root. The root is coupled to the rotary structure and has a bulbous shape, and the airfoil is formed from a plurality of composite plies. The pin defines both a planar first surface and a planar second surface on a pin body having a generally circular cross-section. Further, the pin includes a first end and a second end that contact the rotary structure. The first and second surfaces together form a point that is oriented toward the tip of the airfoil. In one embodiment, the rotary structure is an outer rotor of an interdigitated rotor assembly and the airfoil extends radially inward.

18 Claims, 10 Drawing Sheets

(56) References Cited

U.S. PATENT DOCUMENTS

| | | | |
|---|---|---|---|
| 5,409,353 A * | 4/1995 | Imbault | F01D 5/286 416/212 A |
| 5,436,042 A | 7/1995 | Lau et al. | |
| 6,024,898 A | 2/2000 | Steibel et al. | |
| 6,857,856 B2 | 2/2005 | Potter et al. | |
| 7,169,465 B1 | 1/2007 | Karandikar et al. | |
| 7,300,255 B2 | 11/2007 | Potter et al. | |
| 7,510,379 B2 | 3/2009 | Marusko et al. | |
| 7,550,107 B2 | 6/2009 | Morrison et al. | |
| 8,016,565 B2 | 9/2011 | Berg et al. | |
| 8,151,437 B2 | 4/2012 | Muller et al. | |
| 8,206,118 B2 | 6/2012 | Propheter-Hinckley et al. | |
| 8,231,354 B2 | 7/2012 | Campbell et al. | |
| 8,491,743 B2 | 7/2013 | Pham et al. | |
| 8,794,925 B2 | 8/2014 | McCaffrey | |
| 8,978,729 B2 | 3/2015 | Pham et al. | |
| 9,090,027 B2 | 7/2015 | Sutton et al. | |
| 9,259,858 B2 | 2/2016 | Gupta et al. | |
| 9,482,108 B2 | 11/2016 | Garcia Crespo | |
| 9,499,253 B1 | 11/2016 | White | |
| 2003/0024630 A1 | 2/2003 | George et al. | |
| 2003/0163984 A1 * | 9/2003 | Seda | F01D 9/041 60/226.1 |
| 2004/0163262 A1 | 8/2004 | King et al. | |
| 2005/0158171 A1 | 7/2005 | Carper et al. | |
| 2009/0165924 A1 | 7/2009 | Steibel et al. | |
| 2011/0206522 A1 | 8/2011 | Alvanos et al. | |
| 2012/0255870 A1 | 10/2012 | Rebak et al. | |
| 2012/0301317 A1 | 11/2012 | Alvanos et al. | |
| 2013/0004296 A1 | 1/2013 | Propheter-Hinckley et al. | |
| 2013/0011271 A1 | 1/2013 | Shi et al. | |
| 2013/0064668 A1 | 3/2013 | Paige, II et al. | |
| 2013/0185924 A1 | 7/2013 | Bellanger et al. | |
| 2014/0294572 A1 | 10/2014 | Hillier et al. | |
| 2016/0003094 A1 | 1/2016 | Renggli et al. | |
| 2016/0138406 A1 | 5/2016 | Freeman | |
| 2016/0265370 A1 | 9/2016 | Benson | |
| 2016/0341052 A1 | 11/2016 | Li et al. | |
| 2017/0101873 A1 | 4/2017 | Morgan et al. | |
| 2017/0122113 A1 | 5/2017 | Kittleson et al. | |
| 2017/0130593 A1 | 5/2017 | Weaver | |
| 2017/0211590 A1 | 7/2017 | Moniz et al. | |
| 2017/0362941 A1 | 12/2017 | Craig, III | |

* cited by examiner

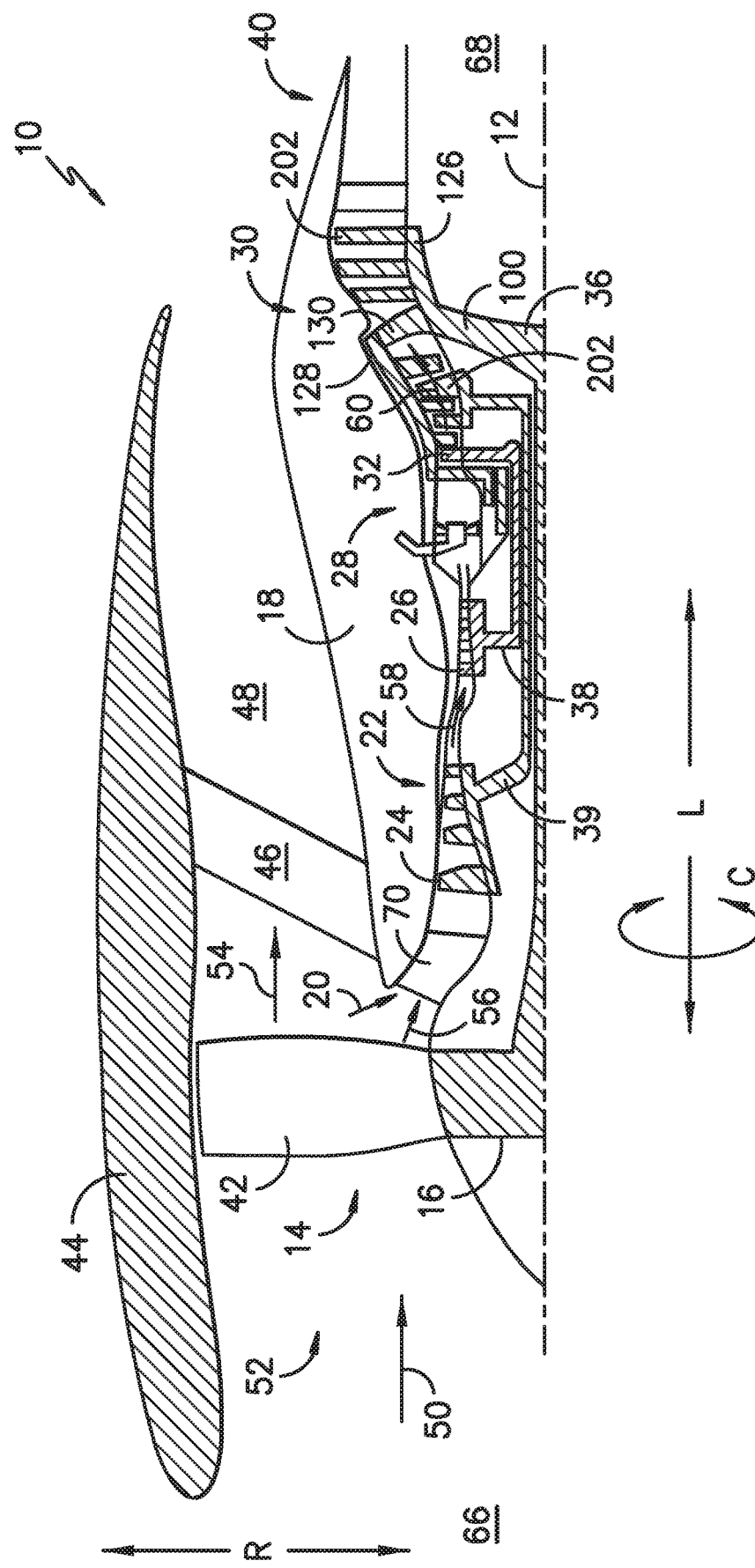
FIG. -1-

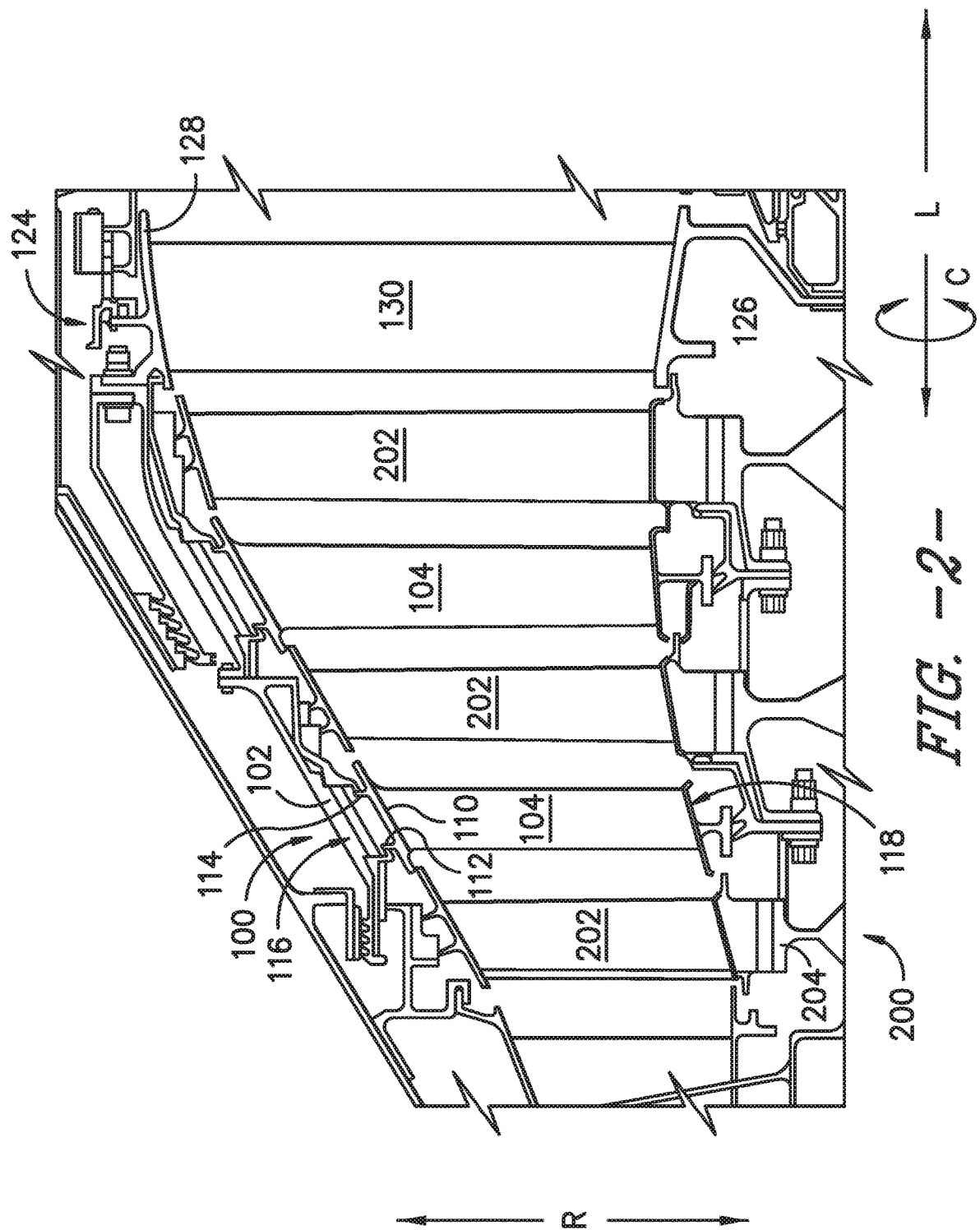

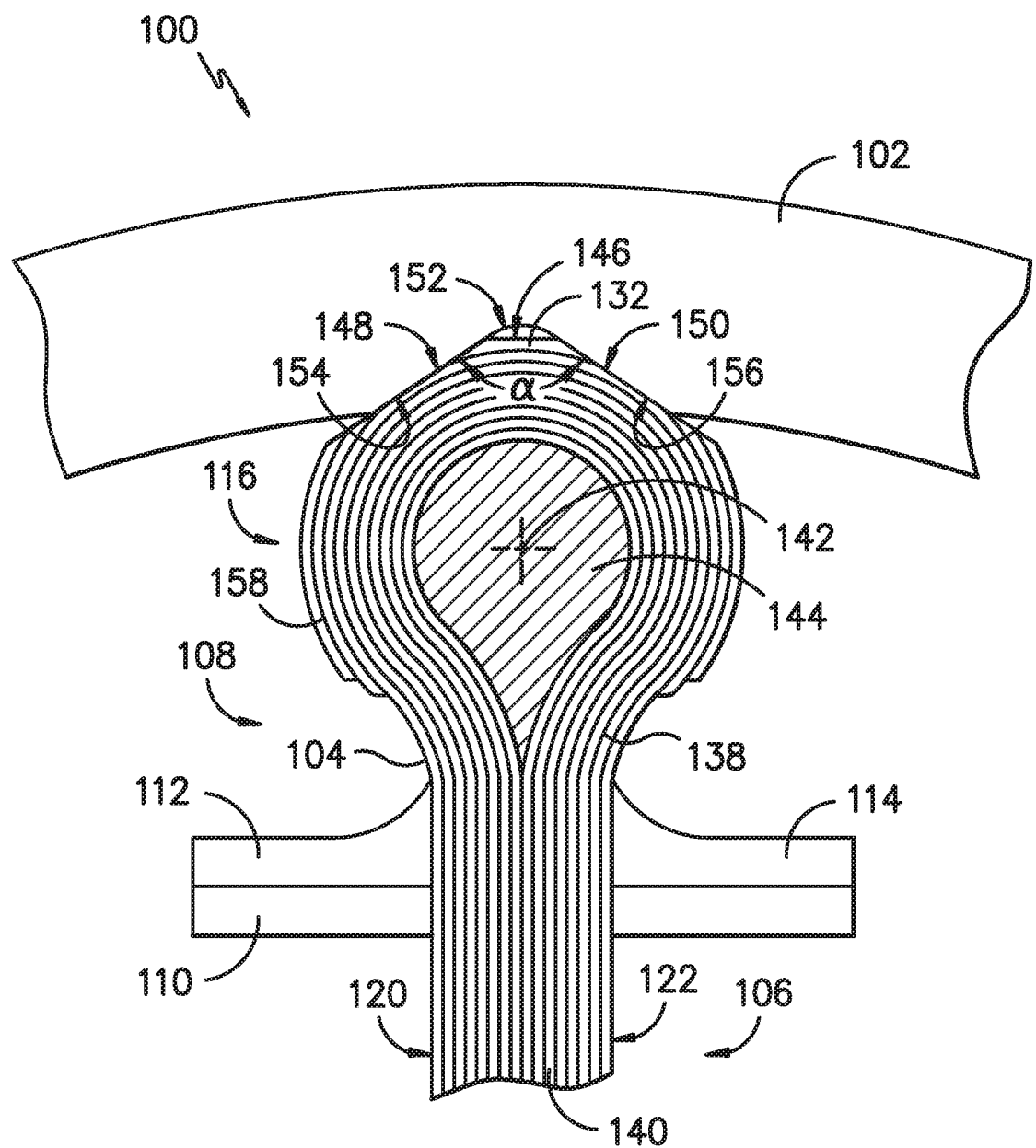
FIG. -3-

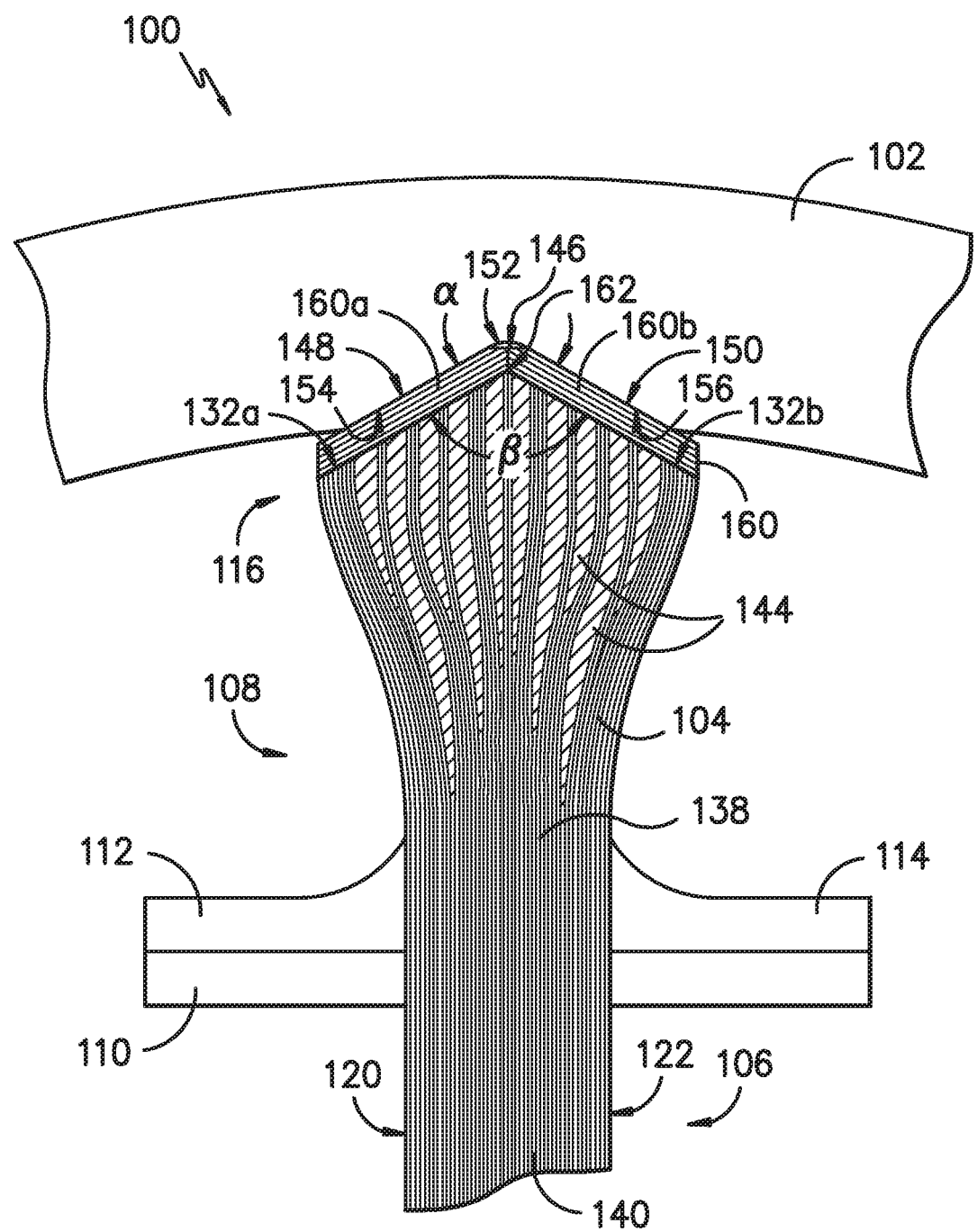
FIG. -4-

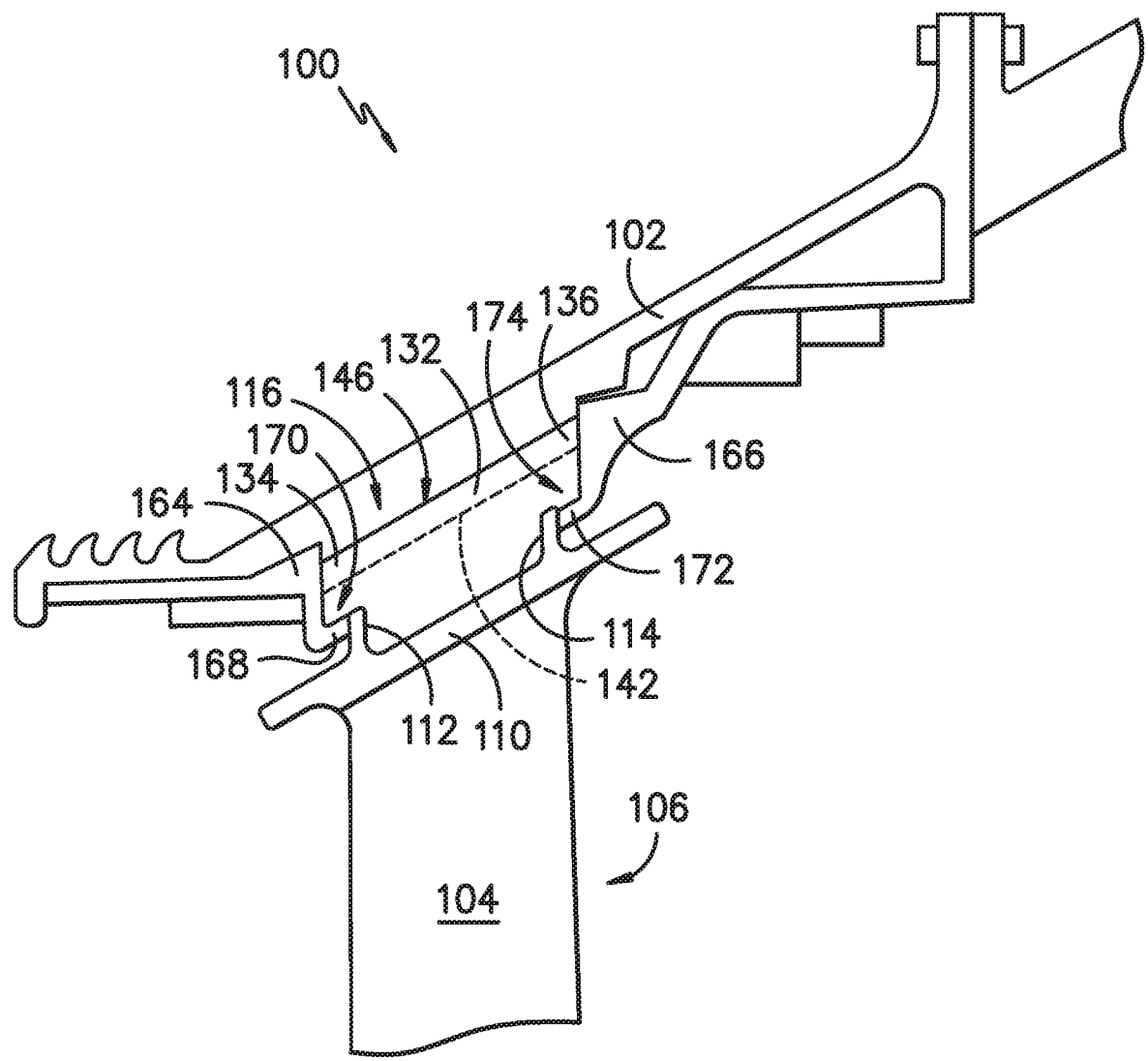
FIG. -5-

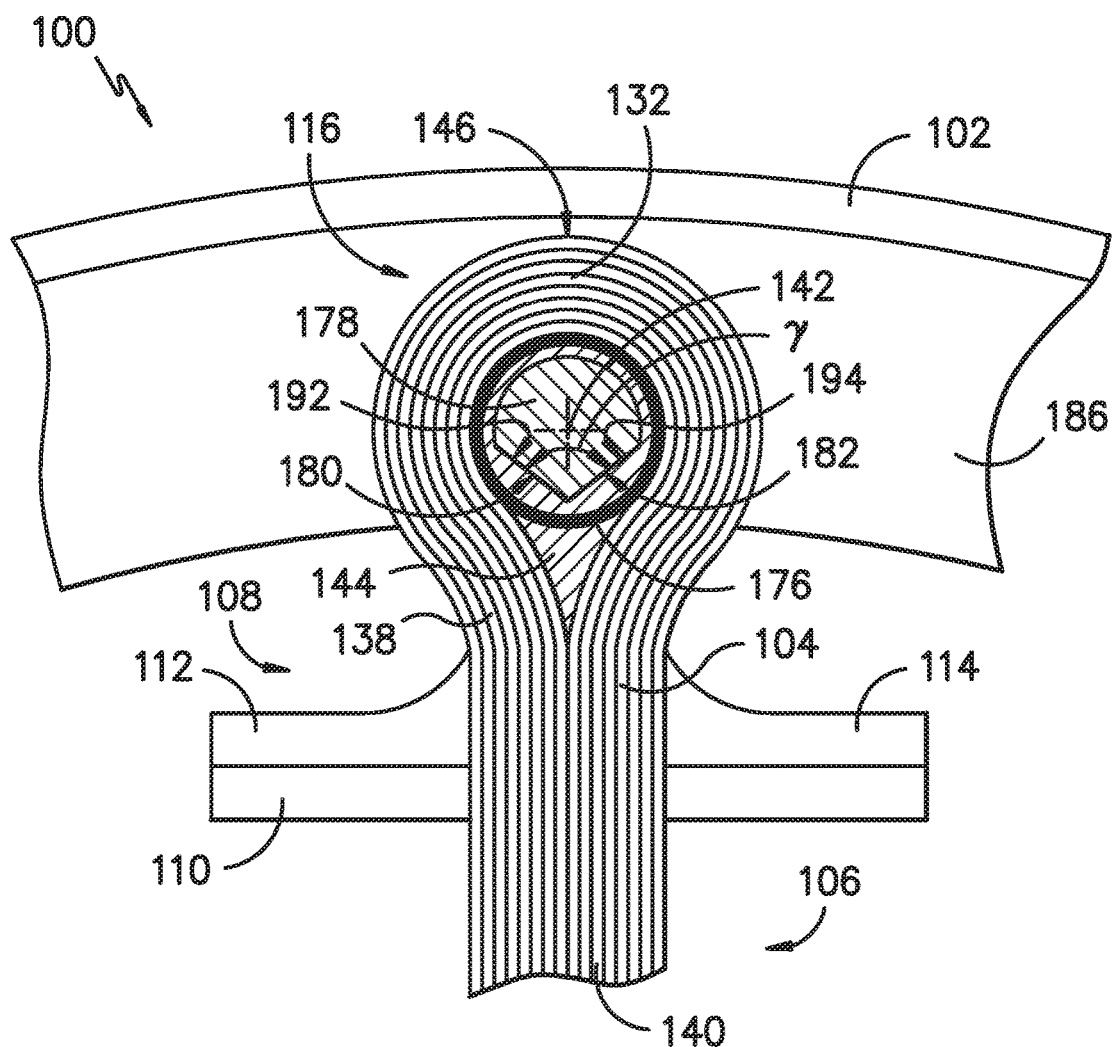
FIG. -6A-
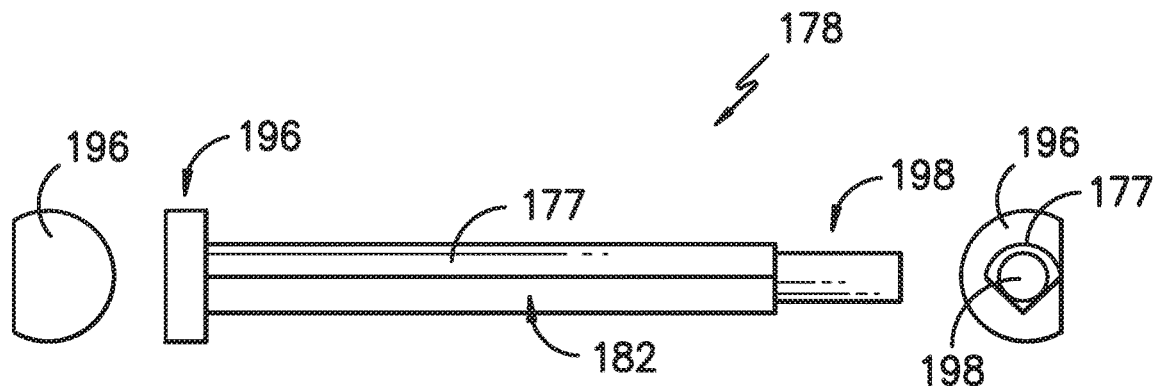
FIG. -6B-

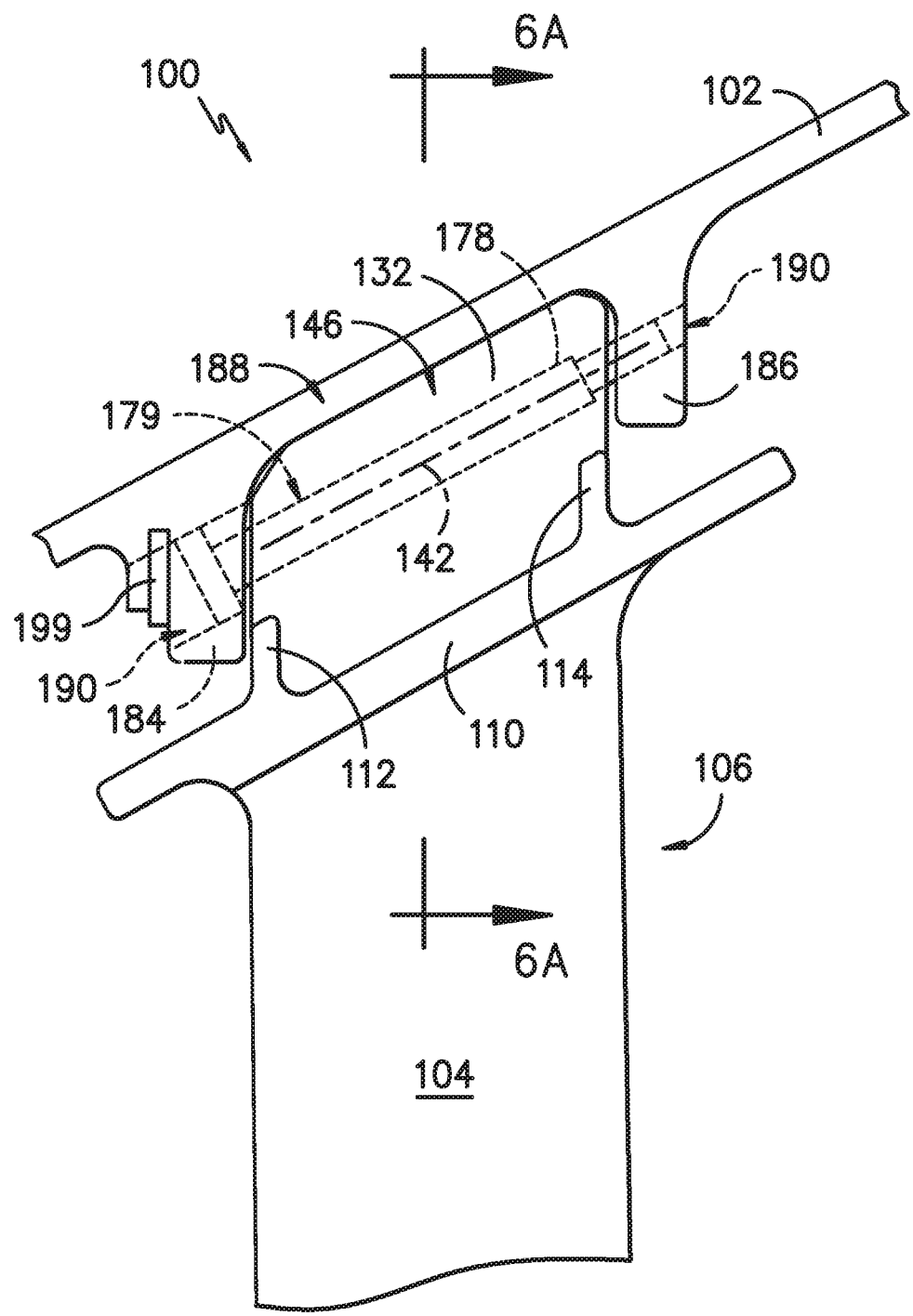
FIG. -7-

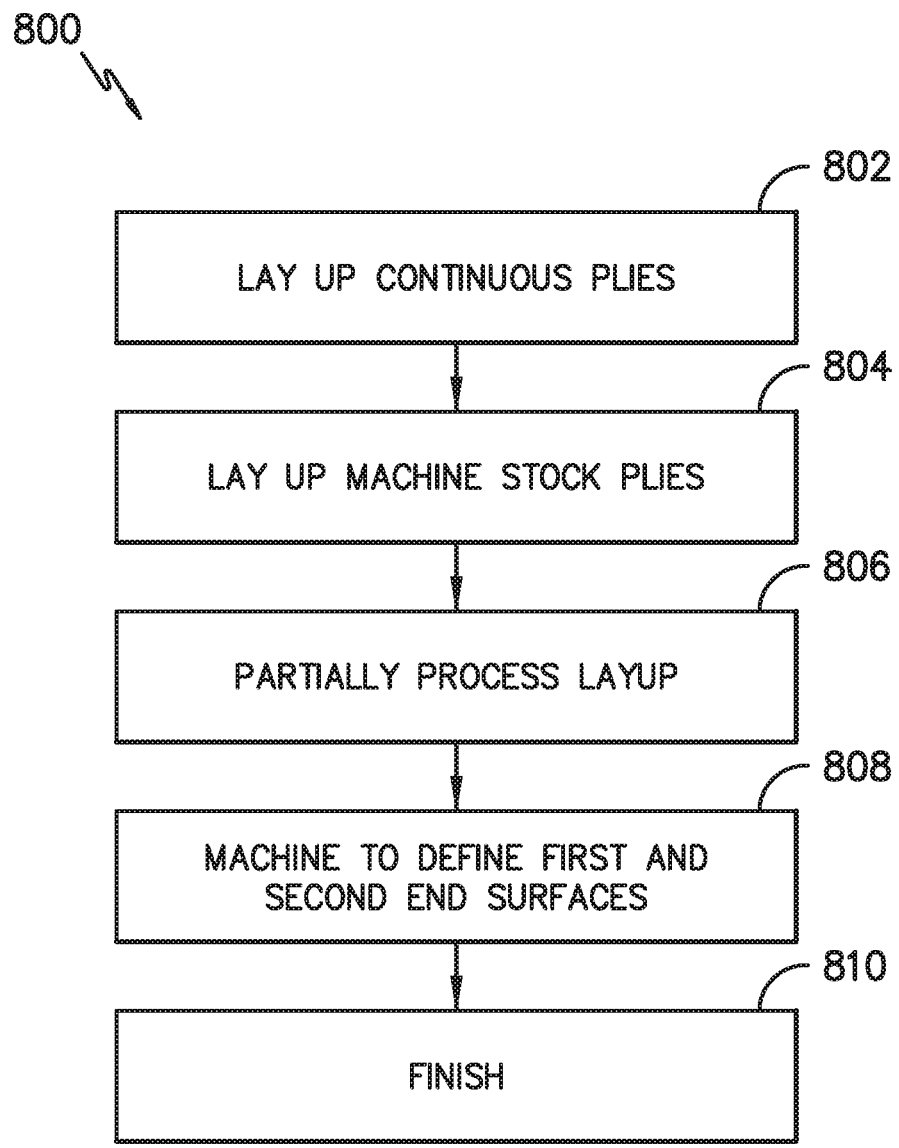
FIG. -8-

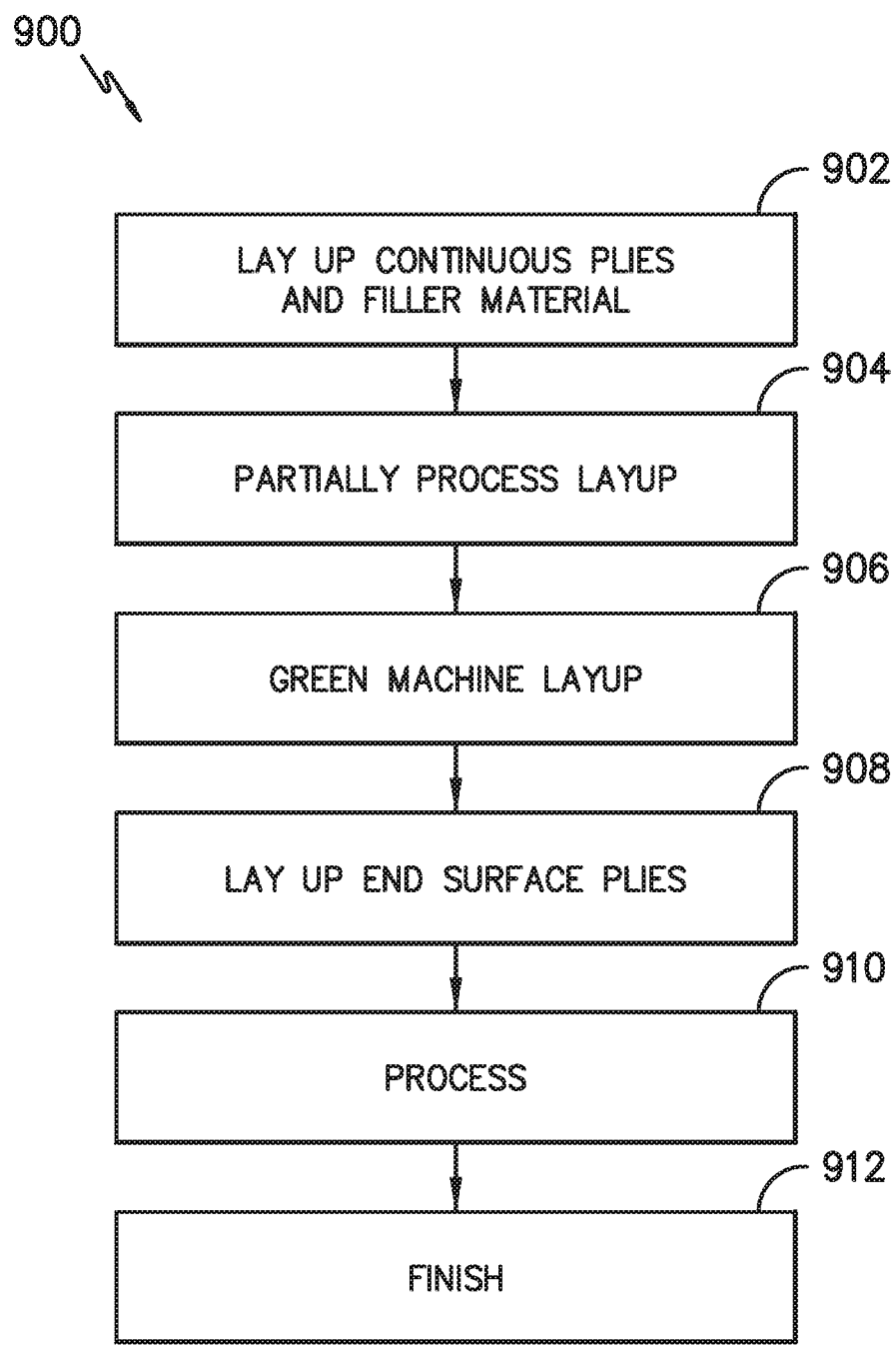
FIG. -9-

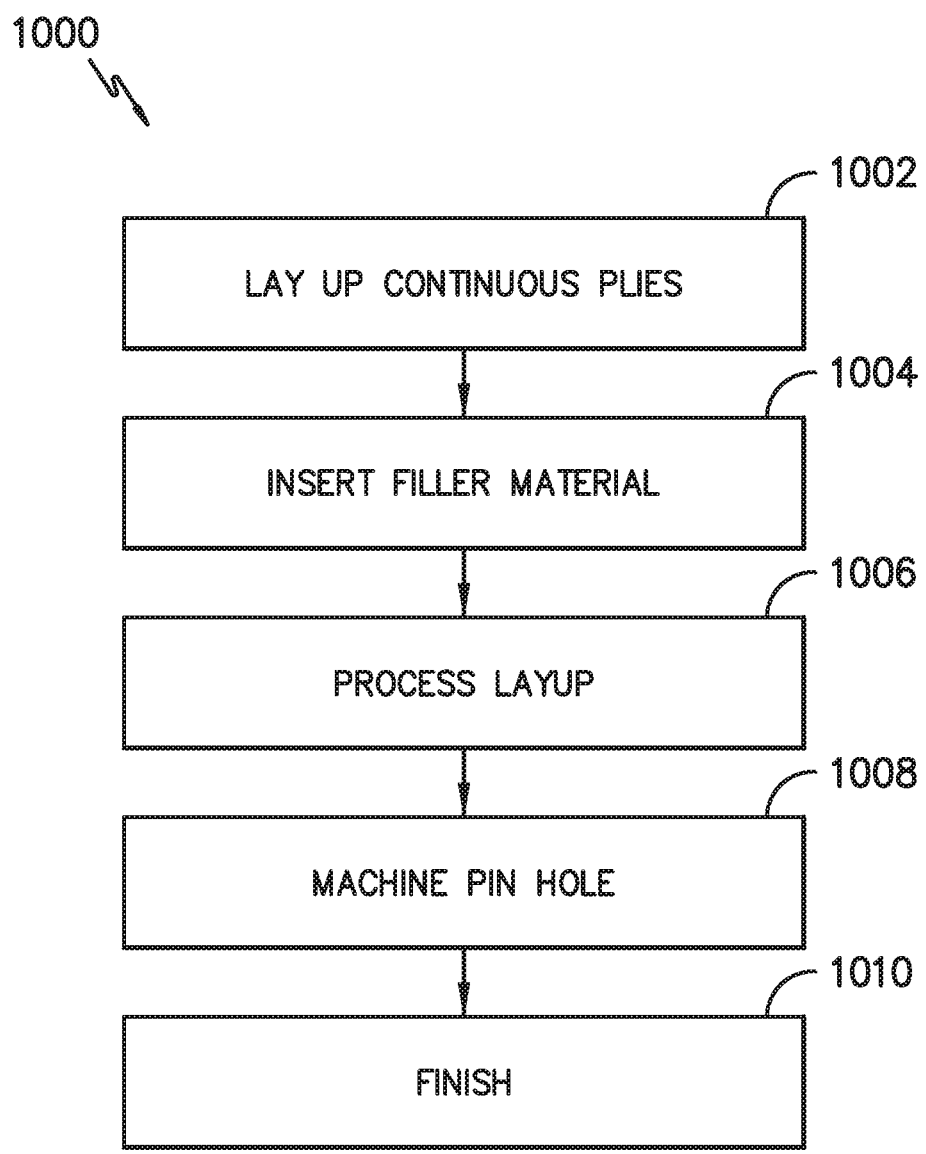
FIG. -10-

COMPOSITE AIRFOIL ASSEMBLY FOR AN INTERDIGITATED ROTOR

FIELD

The present subject matter relates generally to composite components for gas turbine engines and, more particularly, to composite airfoils and composite airfoil assemblies of interdigitated gas turbine engine rotors.

BACKGROUND

More commonly, non-traditional high temperature composite materials, such as ceramic matrix composite (CMC) materials, are being used in applications such as gas turbine engines. Components fabricated from such materials have a higher temperature capability compared with typical components, e.g., metal components, which may allow improved component performance and/or increased engine temperatures. Composite components may provide other advantages as well, such as an improved strength to weight ratio. Moreover, as gas turbine engine designers and manufacturers seek to further increase engine performance and efficiency, one known solution is to incorporate a counter-rotating turbine such that the turbine is vaneless. However, utilizing composite airfoils or blades in an interdigitated rotor assembly presents issues such as how to attach inwardly extending composite blades to an outer rotor (e.g., a rotating drum) without unduly increasing the thickness of the rotor, thereby increasing its weight, and with the capability to withstand stress concentrations at the attachment area. Nonetheless, such a configuration, which places the blades in compression rather than tension, benefits from the use of composite blades, e.g., CMCs have an increased modulus compared to metal that provides an increase in column buckling margin for blades run in compression.

Accordingly, a composite blade having features for attaching to a rotary structure, particularly of an interdigitated rotor assembly, would be useful. In particular, a composite blade that attaches to an outer rotor of an interdigitated rotor assembly in a manner that allows a minimal rotor thickness would be advantageous. Further, a composite blade with an attachment structure that minimizes stress concentrations at its area of attachment to an outer rotor of an interdigitated rotor assembly would be desirable.

BRIEF DESCRIPTION

Aspects and advantages of the invention will be set forth in part in the following description, or may be obvious from the description, or may be learned through practice of the invention.

In one exemplary embodiment of the present subject matter, a rotor assembly for a gas turbine engine is provided. The rotor assembly comprises a rotary structure extending circumferentially about an axial centerline of the gas turbine engine, an airfoil having a root and a tip, and a pin extending through the root. The root is coupled to the rotary structure and has a bulbous shape, and the airfoil is formed from a plurality of plies of a composite material. The pin defines both a planar first surface and a planar second surface on a pin body having a generally circular cross-section. Further, the pin includes a first end and a second end, and the first end and the second end contact the rotary structure. Moreover, the first surface and the second surface together form a point that is oriented toward the tip of the airfoil.

In another exemplary embodiment of the present subject matter, a rotor assembly for a gas turbine engine is provided. The rotor assembly comprises an outer rotor extending circumferentially about an axial centerline of the gas turbine engine, an outer rotor blade having a blade root and a blade tip, and a pin extending through the blade root. The blade root is coupled to the outer rotor, and the outer rotor blade extends inward along a radial direction toward the axial centerline and is formed from a plurality of plies of a composite material. The pin defines both a planar first surface and a planar second surface on a pin body having generally circular cross-section. The pin includes a first end and a second end, and the first end and the second end contact the outer rotor. The first surface and the second surface together form a point that is oriented toward the blade tip.

In a further exemplary embodiment of the present subject matter, a method for manufacturing a blade for an outer rotor of an interdigitated rotor assembly is provided. The method comprises wrapping a plurality of plies of a composite material around a loop of the composite material; inserting a filler material within gaps between the plurality of plies and the loop; processing the plurality of plies and the loop to produce the blade; and defining a pin hole in a blade root of the blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a cross-sectional view of a portion of a turbine section of the gas turbine engine of FIG. 1, according to an exemplary embodiment of the present subject matter.

FIG. 3 provides a schematic cross-sectional view of a blade root attached to an outer rotor of a rotor assembly of the portion of the turbine section shown in FIG. 2, according to an exemplary embodiment of the present subject matter.

FIG. 4 provides a schematic cross-sectional view of a blade root attached to an outer rotor of a rotor assembly of the portion of the turbine section shown in FIG. 2, according to another exemplary embodiment of the present subject matter.

FIG. 5 provides an enlarged view of a segment of the portion of the turbine section illustrated in FIG. 2, according to an exemplary embodiment of the present subject matter.

FIG. 6A provides a schematic cross-sectional view of a blade root attached, using a pin, to an outer rotor of a rotor assembly of the portion of the turbine section shown in FIG. 2, according to another exemplary embodiment of the present subject matter.

FIG. 6B provides an end view of a first end, a side view, and an end view of a second end of the pin of FIG. 6A for attaching the blade root to the outer rotor.

FIG. 7 provides an enlarged view of a segment of the portion of the turbine section illustrated in FIG. 2, according to another exemplary embodiment of the present subject matter.

FIGS. 8, 9, and 10 provide flow diagrams illustrating methods for forming composite airfoils according to various embodiments of the present subject matter.

Repeat use of reference characters in the present specification and drawings is intended to represent the same or analogous features or elements of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," "third," etc. may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

The terms "low," "high," or their respective comparative degrees (e.g., lower, higher, where applicable) each refer to relative speeds within an engine, unless otherwise specified. For example, a "low turbine" or "low speed turbine" defines a rotational speed generally lower than a "high turbine" or "high speed turbine." Alternatively, unless otherwise specified, the aforementioned terms may be understood in their superlative degree. For example, a "low turbine" may refer to the lowest maximum rotational speed turbine within a turbine section, and a "high turbine" may refer to the highest maximum rotational speed turbine within the turbine section. As used herein, "high turbine" or "high speed turbine" generally refers to one or more turbine rotors defining a higher maximum rotational speed than the low turbine or low speed turbine. Still further, reference to the "high turbine" may include a plurality thereof, each defining one or more maximum rotational speeds separate or independent from one another and greater than a maximum rotational speed of the low speed turbine.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged; such ranges are identified and include all the sub-ranges contained therein unless context or language indicates otherwise. For example, all ranges disclosed herein are inclusive of the endpoints, and the endpoints are independently combinable with each other.

Embodiments of a rotor assembly are generally provided herein that utilize composite airfoils attached to a rotary structure, such as the outer rotor of a counter-rotating, vaneless gas turbine engine. The embodiments generally shown and described herein may be applied to various sections of a gas turbine engine, e.g., a turbine section and/or a compressor section, and particularly to an interdigitated turbine or compressor section, to increase engine performance through the use of composite materials. Further, the composite airfoils described herein include features for resisting or minimizing the impact of compressive loading of the airfoils. Moreover, the airfoil to rotary structure attachment described herein helps reduce the weight of the rotor assembly, as well as the attachment stress concentrations. Additionally, the rotor assembly embodiments provided generally may enable interdigitation using composite components, or further extend interdigitation, of a first rotor assembly among one or more second rotor assembly assemblies. Such interdigitation enables increased gas turbine engine efficiency, improved performance, decreased fuel burn, and improved operability of the engine at higher rotational speeds.

An interdigitated compressor or turbine section may increase fuel efficiency, operational efficiency, and/or power output while reducing weight, part count, and/or packaging (e.g., radial and/or axial dimensions). For example, the interdigitated compressor or turbine section may enable increased bypass ratio and/or overall pressure ratio of the gas turbine engine, thereby increasing fuel efficiency, operational efficiency, and/or power output relative to other engines of similar power output and/or packaging. The interdigitated compressor or turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") while additionally reducing an average work factor per stage of the turbine section.

Referring now to the drawings, wherein identical numerals indicate the same elements throughout the figures, FIG. 1 is a schematic cross sectional view of an exemplary gas turbine engine 10 (herein referred to as "engine 10"), shown as a high bypass turbofan engine, incorporating an exemplary embodiment of a turbine section 30 according to an aspect of the present subject matter. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends therethrough for reference purposes. The engine 10 defines a longitudinal direction L, a radial direction R, an upstream end 66 and a downstream end 68 along the longitudinal direction L, and a circumferential direction C.

In general, the engine 10 may include a substantially tubular outer casing 18 that defines an annular inlet 20. The outer casing 18 encases, in serial flow arrangement along the longitudinal direction L, a compressor section 22, a combustion section 28, an interdigitated turbine section 30, and a jet exhaust nozzle section 40. A fan assembly 14 is disposed generally forward or upstream of the compressor section 22. In the embodiment shown in FIG. 1, the compressor section 22 includes a first, high pressure (HP) compressor 24 and a second, intermediate pressure (IP) compressor 26 in alternating or interdigitated arrangement along the longitudinal direction L. The fan assembly 14 includes at least one stage of a plurality of fan blades 42 coupled to a fan rotor 16. The plurality of fan blades 42 are coupled to and extend outwardly from the fan rotor 16 in the radial direction R. In various embodiments, the fan rotor 16 may include a plurality of stages of fan blades 42 along the longitudinal direction L. In some embodiments, the fan rotor 16 may be a low speed shaft 36 that is driven by at least one portion of the turbine section 30 as further described herein. In various embodiments, multiple stages of a plurality of fan blades 42 coupled to the low speed shaft 36 may be referred to as a low pressure (LP) compressor. In still other embodiments, the fan assembly 14 may be coupled to a high speed shaft 38 coupled to the turbine section 30, and the fan assembly 14 may further include a speed reduction assembly disposed between the fan rotor 16 and the high speed shaft 38. The speed reduction assembly may reduce the rotational speed of the fan rotor 16 relative to the turbine rotor of the turbine section 30 to which the fan rotor 16 is attached via the high speed shaft 38.

An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

As further illustrated in FIG. 1, during operation of the engine 10 a volume of air as indicated schematically by arrows 50 enters the engine 10 through an associated inlet 52 of the nacelle and/or fan assembly 14. As the volume of air 50 passes across the fan blades 42, a first portion of the air as indicated schematically by arrows 54 is directed or routed into the bypass airflow passage 48 while a second portion of the air as indicated schematically by arrows 56 is directed through the fan assembly 14 and through the inlet 20. The ratio between the first portion of air 54 and the second portion of air 56 is commonly known as a bypass ratio.

The air 56 is progressively compressed as it flows through the compressor section 22 toward the combustion section 28. The now compressed air, as indicated schematically by arrows 58, flows into the combustion section 28 where a fuel is introduced, mixed with at least a portion of the compressed air 58, and ignited to form combustion gases 60. The combustion gases 60 flow into the turbine section 30, causing the first rotor assembly 100 and second rotor assembly 200 of the turbine section 30 to rotate and support operation of respectively coupled rotary members in the compressor section 22 and/or fan assembly 14. The combustion gases 60 are subsequently routed through the jet exhaust nozzle section 40 of the engine 10 to provide propulsive thrust. Simultaneously, the pressure of the first portion of air 54 is substantially increased as the first portion of air 54 is routed through the bypass airflow passage 48 before it is exhausted from a fan nozzle exhaust section 62 of the engine 10, also providing propulsive thrust. The turbine section 30 and the jet exhaust nozzle section 40 at least partially define a hot gas path 64 for routing the combustion gases 60 through the engine 10.

Referring now to FIG. 2, the turbine section 90 includes a first rotor assembly 100 in alternating arrangement along the longitudinal direction L with a second rotor assembly 200, i.e., the first and second rotor assemblies 100, 200 are interdigitated. The first rotor assembly 100 includes an annular outer rotor 102 that extends along the circumferential direction around the axial centerline 12 and is rotatable about the axial centerline 12. As such, the outer rotor 102 is a rotary structure extending circumferentially about the axial centerline 12 of the engine 10; in various embodiments, the outer rotor 102 is a drum or disk. The outer rotor 102 also extends along the longitudinal direction L and at least partially surrounds the second rotor assembly 200. Further, the first rotor assembly 100 includes an outer rotor airfoil or blade 104 coupled to the outer rotor 102 and extending inward along the radial direction R. In exemplary embodiments, the first rotor assembly 100 includes a plurality of outer rotor airfoils or blades 104 in adjacent circumferential arrangement. The outer rotor 102, the blades 104, and the attachment of the blades 104 to the outer rotor 102 are described in greater detail below.

The second rotor assembly 200 includes an inner rotor 204. A plurality of second rotor airfoils or blades 202 extends outward along the radial direction R from the inner rotor 204, i.e., away from the axial centerline 12. The inner rotor 204 may define a drum, disk, bladed disk (e.g., Blisk) or integrally bladed rotor (IBR). Each of the plurality of inner rotor airfoils or blades 202 includes an inner blade root and inner blade tip, where the inner blade root is attached to the inner rotor 204 and the inner blade tip is the radially outermost point of the inner blade 202, and each blade 202 may be fixed to the inner rotor 204 via hangers, slots, dovetails pins, mechanical fasteners, other suitable attachment schemes, or combinations of any of the foregoing. In various embodiments, the inner rotor 204 and inner rotor airfoils or blades 202 may be defined substantially as a single, integral piece.

In various embodiments, the portion of the turbine section 30 shown in FIG. 2 defines a counter-rotating low speed turbine rotor assembly. The first rotor assembly 100 and the second rotor assembly 200 may each be coupled to the low speed shaft 36. In one embodiment, the first rotor assembly 100 is coupled to the low speed shaft 36 and the second rotor assembly 200 is coupled to the low speed shaft 36 via a speed reduction assembly. The speed reduction assembly may include a gearbox, a gear assembly, or a hydraulic or pneumatic speed change assembly. The low speed shaft 36 is coupled at an opposing longitudinal end to the fan rotor 16 of the fan assembly 14.

In another embodiment, the second rotor assembly 200 is coupled to the high speed shaft 38 that is further coupled at an opposing longitudinal end to the HP compressor 26. In still various embodiments, the turbine section 30 may further include a third rotor assembly 300 coupled to a low pressure (LP) or intermediate pressure (IP) compressor 24 at an opposing longitudinal end of the engine 10 via a third shaft 39. In still other embodiments, the first rotor assembly 100 may surround one or more of the aforementioned embodiments of the second rotor assembly 200, third rotor assembly, or both. In still various embodiments, the first rotor assembly 100 is in counter-rotating arrangement relative to the second rotor assembly 200, the third rotor assembly, or both.

The various embodiments of the turbine section 30 described herein generally define an at least partially independently rotatable first rotor assembly 100 relative to the second rotor assembly 200. For example, the first rotor assembly 100 may define a generally fixed or proportional speed relative to the second rotor assembly 200. As another example, the first rotor assembly 100 may be independently rotatable relative to the second rotor assembly 200, the third rotor assembly 300, or both.

In some embodiments, components of the engine 10, particularly components within or defining the hot gas path 64 such as the outer rotor airfoils or blades 104, may comprise a composite material, such as a non-metallic ceramic matrix composite (CMC) material having high temperature capability. Composite materials generally comprise a fibrous reinforcement material embedded in matrix material, e.g., a ceramic matrix material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

As depicted in FIG. 2, each outer rotor airfoil or blade 104 includes an airfoil portion 106 and a shank portion 108 fabricated from a CMC material. Each outer rotor blade 104 further includes a platform 110, a forward skirt 112, and an aft skirt 114, which also are formed from the CMC material. The platform 110 extends generally along the longitudinal direction L, while each skirt 112, 114 extends generally along the radial direction R. As described in more detail below, an airfoil or blade root 116 (FIG. 3) of the shank portion 108 is secured or coupled to the outer rotor 102. The airfoil portion 106 generally extends radially from shank portion 108 so as to project into the hot gas path 64 of combustion gases 60 flowing through turbine section 30. For example, the airfoil portion 106 may extend radially inwardly from shank portion 108 secured to the outer rotor 102 to an airfoil or blade tip 118. Additionally, the airfoil portion 106 may generally define an aerodynamic shape. As an example, the airfoil portion 106 may be shaped so as to have a pressure side 120 (FIG. 3) and a suction side 122 (FIG. 3) configured to facilitate the capture and conversion of the kinetic energy of the combustion gases into usable rotational energy.

The first rotor assembly 100 further includes a rotatable torque frame 124. The torque frame 124 defines a generally annular structure rotatable about the axial centerline 12. The torque frame 124 includes an inner ring 126, an outer ring 128, and a structural member 130 extending generally along the radial direction R and coupled to the inner ring 126 and the outer ring 128. Like the outer rotor blades 104, in exemplary embodiments, the first rotor assembly 100 includes a plurality of structural members 130 in adjacent circumferential arrangement. Each of the inner ring 126 and the outer ring 128 are generally concentric relative to one another. The inner ring 126 and the outer ring 128 are further concentric relative to the axial centerline 12. The structural members 130 transfer radial and circumferential loads along the inner ring 126 to the outer ring 128.

In various embodiments, the structural members 130 define a generally perpendicular, acute, or obtuse lean angle relative to the axial centerline 12. The structural members 130 generally provide support relative to an axial load, such as generated by combustion gases 60 from the combustion section 28. The torque frame 124 is further configured to extract work or energy from the combustion gases 60 such as to enable rotation of the first rotor assembly 100 including the torque frame 124 and the outer rotor 102. As such, in various embodiments, the structural members 130 of the torque frame 124 may further define an airfoil, such as including a pressure side, a suction side, a leading edge, and a trailing edge, to efficiently and effectively extract energy from the combustion gases 60 to induce rotation of the first rotor assembly 100.

Referring still to FIG. 2, the second rotor assembly 200 includes a second airfoil or blade 202 disposed inward along the radial direction R of the outer rotor 102 of the first rotor assembly 100. More particularly, in exemplary embodiments, the second rotor assembly 200 includes a plurality of second airfoils or blades 202 in adjacent circumferential arrangement, each airfoil or blade 202 extending radially outward from an inner rotor 204. In various embodiments, the first rotor assembly 100 and the second rotor assembly 200 are each rotatable about the axial centerline 12 of the engine 10. The first rotor assembly 100 and the second rotor assembly 200 are in counter-rotating arrangement (i.e., rotating in opposite directions around the axial centerline 12 relative to one another). However, it should be appreciated that in other embodiments, the first turbine rotor 100 and the second rotor assembly 200 could be in co-rotating arrangement (i.e., rotating in the same direction around the axial centerline 12). In either event, the first rotor assembly 100 replaces traditional stationary nozzles or vanes such that the gas turbine engine 10 may be described as vaneless.

Although the first rotor assembly 100 and the second rotor assembly 200 are depicted in FIGS. 1 and 2 as portions of the turbine section 30, it should be appreciated that their various embodiments described herein may further apply to an interdigitated compressor section 22, such as generally shown in FIG. 1. For example, in one embodiment, the first compressor 24 includes the outer rotor 102, with the plurality of outer rotor airfoils 104 disposed in alternating arrangement with airfoils of the second compressor 26. The embodiments of the first rotor assembly 100 generally shown and described herein may be applied to an interdigitated compressor section 22.

Referring now to FIG. 3, a schematic cross-section view is provided of a blade 104 attached to the outer rotor 102, according to an exemplary embodiment of the present subject matter. As shown in FIG. 3, the airfoil portion 106 and shank portion 108 of each outer rotor airfoil or blade 104 are fabricated from a plurality of plies 138 of a CMC material. In the exemplary embodiment shown in FIG. 3, a portion 140 of the plurality of plies 138 extends from the pressure side 120 of blade 104 to the suction side 122 of blade 104. In the illustrated embodiment, each ply 140 wraps from the pressure side 120 to suction side 122 to define the blade 104. Preferably, the plies 140 contain continuous CMC fibers along their lengths such that the continuous CMC fibers wrap around an axial midline 142 of the blade root 116; as such, the plies 140 may be referred to as continuous plies 140. Continuous fiber CMC plies can help avoid relying on the interlaminar capability of the blade material to resist stresses on the blade, and the continuous fibers are maintained by wrapping each ply around the midline 142. In one embodiment, the plurality of continuous plies 140 may be wrapped around a mandrel, which extends along the midline 142, to form a generally teardrop shaped opening into which one or more filler or ply packs 144 (which also may be referred to as noodles) are placed. As such, the blade root 116 may have a generally bulbous shape. The filler packs 144 may comprise, e.g., rolled up plies, chopped CMC fiber within a matrix, or any other appropriate material. Further, the blade root 116 of the shank portion 108 may define an outermost point or edge 146, i.e., the radially outermost point or edge of the blade 104. In an exemplary embodiment, the outermost point or edge 146 may be a surface of the blade 104 furthermost from the tip 118 of the blade 104.

As shown in FIG. 3, the blade root 116 is coupled to the outer rotor 102, i.e., the root 116 of the airfoil 104 of the rotor assembly 100 is coupled to the rotary structure 102. A portion of the plurality of plies 138 defines a first end surface 148 and a second end surface 150 at the blade root 116. The first end surface 148 and the second end surface 150 extend from the radially outermost edge 146 of the outer rotor blade 104. The first and second end surfaces 148, 150 extend from the edge 146 such that the first and second end surfaces 148, 150 define an angle α therebetween. Thereby, the first and second end surfaces 148, 150 together or cooperatively define a generally chisel-shaped, wedge-shaped, or pointed end 132 of the blade root 116. As such, the chisel-shaped end 132 may be understood to be defined by two planar surfaces 148, 150 that intersect at a common line or surface 146, with an angle α defined between the intersecting surfaces 148, 150.

Further, the first end surface 148 and the second end surface 150 are in contact with the outer rotor 102. More particularly, the outer rotor 102 defines a groove 152 for receipt of the blade root 116. The groove 152 is defined by a first groove surface 154 and a second groove surface 156, and the groove 152 receives the end 132 of the blade root 116 such that the first end surface 148 contacts the first groove surface 154 and the second end surface 150 contacts the second groove surface 156. That is, the first and second end surfaces 148, 150 provide contact surfaces for contacting the outer rotor 102. As shown in FIG. 3, the first end surface 148 extends parallel to the first groove surface 154 and the second end surface 150 extends parallel to the second groove surface 156. The groove 152 is shaped complementary to the root end 132 and receives the blade root 116 with virtually no space between the blade 104 and the outer rotor 102, i.e., the chisel-shaped, wedge-shaped, or pointed end 132 of the blade root 116 is received by the groove 152 such that there are little to no gaps between the blade 104 and the outer rotor 102. As depicted in FIG. 3, in some embodiments, the outermost edge 146 is a surface and the groove 152 includes a fillet between the first and second groove surfaces 154, 156 such that a small space or gap is defined between the edge surface 146 and the fillet of the groove 152.

In the exemplary embodiment illustrated in FIG. 3, the first and second end surfaces 148, 150 are formed from sacrificial machine stock CMC material so as to preserve the continuous fiber CMC plies 140 wrapped around the midline 142. More specifically, the plurality of CMC plies 138 includes continuous plies 140 and machine stock or sacrificial plies 158. As described above, the continuous plies 140 extend from the pressure side 120 of the blade 104, around one or more filler packs or noodles 144 at the shank portion 108 of the blade 104, to a suction side 122 of the blade 104. As shown in FIG. 3, the machine stock plies 158 wrap around the continuous plies 140 at the blade root 116 such that the machine stock plies 158 are the outermost plies of the plurality of CMC plies 138 at the blade root 116. As such, the machine stock plies 158 include the portion of the plurality of plies 138 that defines the first end surface 148 and the second end surface 150.

The machine stock plies 158 machined to define the first end surface 148 and the second end surface 150. That is, the machine stock plies 158 are layered around the continuous plies 140 at the blade root 116 to provide machine stock or sacrificial material for machining to define the first and second end surfaces 148, 150 of the blade 104. As such, at least a portion of, and preferably a majority of, the continuous plies 140 remain continuous and are not cut or otherwise disrupted to form the first and second end surfaces 148, 150. For example, the plies 138 may be laid up on a tool, mandrel, mold, or other suitable supporting device or surface to form a composite ply layup. After the plurality of composite plies 138 are laid up to form the composite ply layup, the layup is processed, e.g., compacted, cured, fired, and densified as further described herein, and machined at the root end 132 to define the first and second end surfaces 148, 150. In some embodiments, the layup may be partially processed, e.g., compacted and autoclaved, to form a green state layup, and the root end 132 of the green state layup may be machined to roughly define the first and second end surfaces 148, 150. That is, the end surfaces 148, 150 may be roughed in through green machining (described in greater detail below), with final machining completed after full processing of the blade layup to define the end surfaces 148, 150 with the required tolerances.

As illustrated in FIG. 3, the machined first and second end surfaces 148, 150 are precisely defined to fit within the groove 152 of the outer rotor 102. That is, the machined first and second end surfaces 148, 150 correspond to or are complementary to the contour of the groove 152 (i.e., the first and second groove surfaces 154, 156) against which the machined surfaces 148, 150 are positioned. Thus, machining the layup of composite plies 138 to define the chisel-shaped, wedge-shaped or pointed root end 132 may help provide a better fit with the outer rotor 102. A more precise fit between the blade root 116 and the outer rotor 102 allows the groove 152 to be relatively shallow. Thus, the chisel-shaped, wedge-shaped or pointed root end 132 facilitates a shallow groove 152, which helps minimize the thickness of the outer rotor 102, thereby reducing the weight of the first rotor assembly 100. Further, the chisel-shaped, wedge-shaped, or pointed end 132, with first and second end surfaces 148, 150 extending parallel to the groove surfaces 154, 156 that the first and second end surfaces 148, 150 contact, helps the blade 104 withstand the compressive forces on the blade 104 at the contact surfaces between the blade 104 and outer rotor 102. Moreover, preserving the continuous plies 140 wrapped around the midline 142 helps protect against delaminations of the composite blade 104.

Turning now to FIG. 4, a schematic cross-section view is provided of a blade 104 attached to the outer rotor 102, according to another exemplary embodiment of the present subject matter. As illustrated in FIG. 4, in some exemplary embodiments, the continuous plies 140 extend generally along the blade span from the blade tip 118 to the blade root 116, but unlike the embodiment shown in FIG. 3, the continuous plies 140 in the embodiment of FIG. 4 do not wrap around the midline 142 at the blade root 116. Instead, filler or ply packs 144 are inserted between groups of continuous plies 140 to build up the thickness of the shank portion 108 and to define the generally bulbous shaped blade root 116. Additionally, the plurality of plies 138 forming the exemplary blade 104 includes a plurality of end surfaces plies 160. The end surface plies 160 include the portion of the plurality of plies 138 that defines the first end surface 148 and the second end surface 150. The end surface plies 160 are joined to the continuous plies 140 to define the first end surface 148 and the second end surface 150, i.e., a first portion 160a of the end surface plies 160 defines the first end surface 148 and a second portion 160b of the end surface plies 160 defines the second end surface 150.

As further illustrated in FIG. 4, the blade root end 132 is received within the groove 152 of the outer rotor 102. Like the embodiment shown in FIG. 3, the groove 152 is shaped complementary to the root end 132 and receives the blade root 116 with virtually no space between the blade 104 and the outer rotor 102, i.e., the chisel-shaped, wedge-shaped, or pointed end 132 of the blade root 116 is received by the groove 152 such that there are little to no gaps between the blade 104 and the outer rotor 102. Like the embodiment of FIG. 3, the outermost edge 146 may be a surface that is defined by the first and second portions 160a, 160b of the end surface plies 160, and the groove 152 comprises a fillet between the first and second groove surfaces 154, 156 such that a small space or gap is defined between the edge surface 146 and the fillet of the groove 152. Further, the first portion 160a of the end surface plies 160 extends parallel to the first groove surface 154 and the second portion 160b of the end surface plies 160 extends parallel to the second groove surface 156. In exemplary embodiments, the continuous plies 140 of the blade 104 are green machined to define a chisel-shaped, wedge-shaped, or pointed root end 132. That is, the continuous plies 140 are green machined to define a first surface 132a and a second surface 132b that each extend from an edge 162 such that an angle β is defined between the first and second surfaces 132a, 132b. More particularly, after a plurality of composite plies 138, e.g., continuous plies 140, are laid up to form a composite ply blade layup as described above, the layup is partially processed to form a green state layup. For instance, the layup may be compacted and cured, e.g., in an autoclave. After partial processing, the composite plies 138 forming the layup are in a green state, retaining some flexibility and malleability. Such flexibility and malleability may help in machining the layup, e.g., may make machining easier compared to machining a fully processed component, which is relatively harder and more brittle. Because the green state layup is machined in its green state, the machining process may be referred to as green machining. Green machining may comprise one or more of electrical discharge machining (EDM), i.e., EDM drilling; laser machining; precision machining; or other suitable machining or cutting techniques or processes. As described, the layup is green machined to define the first and second surfaces 132a, 132b with the angle β defined therebetween as shown in FIG. 4.

A laminate or ply stack of end surface plies 160 is positioned on each of the first surface 132a and second surface 132b to define the first and second end surfaces 148, 150, respectively. As such, the end surface plies 160 define the outermost edge 146 of the blade 104, with the angle α defined between the first end surface 148 and the second end surface 150, and the end surface plies 160 together or cooperatively define the chisel-shaped, wedge-shaped, or pointed end 132. As further shown in FIG. 4, the end surface plies 160 are laid up with the continuous plies 140 such that the first portion 160a of the end surface plies 160 is parallel to the first surface 132a and the first groove surface 154, and the second portion 160b of the end surface plies 160 is parallel to the second surface 132b and the second groove surface 156. That is, the fibers within the first portion 160a of the end surface plies 160 are generally parallel to the first groove surface 154 and the fibers within the second portion 160b of the end surface plies 160 are generally parallel to the second groove surface 156. Orienting the fibers within the plies 160 generally parallel to the groove surfaces 154, 156 helps the blade 104 withstand the compressive forces on the blade 104 at the contact surfaces between the blade 104 and outer rotor 102.

Although illustrated in FIGS. 3 and 4 as generally symmetrical, it will be appreciated that the first and second end surfaces 148, 150 need not be symmetrical. For example, either the first end surface 148 or the second end surface 150 could be shorter than the other end surface. As another example, one of the end surfaces 148, 150 could be at a different angle relative to the other. For instance, the first end surface 148 could be at a first angle that is defined from a center axis of the blade 104, which extends radially through the midline 142, to the first end surface 148, and the second end surface 150 could be at a second angle that is defined from the center axis to the second end surface 150. In such embodiments, the first angle is different from the second angle, unlike the embodiments illustrated in FIGS. 3 and 4, where the angles from the first and second surfaces 148, 150 to the center axis are equal (i.e., half of the angle α). Other differences may exist between the first and second end surfaces 148, 150 such that the surfaces 148, 150 are asymmetrical in some embodiments.

As generally shown in FIG. 2 and in further detail in FIG. 5, in exemplary embodiments, a forward retainer 164 and an aft retainer 166 are used to axially and radially retain the blades 104 within the groove 152 defined in the outer rotor 102. More particularly, an annular forward retainer or forward retention member 164 is positioned against the outer rotor 102 upstream of the blade root 116. An annular aft retainer or aft retention member 166 is positioned against the outer rotor 102 downstream of the blade root 116. The shank portion 108 of the blade 104 defines a forward flange 134 and an aft flange 136. The forward retainer 164 includes an arm 168 inward of the forward flange 134. The arm 168 of the forward retainer 164 defines a lip 170 on which the forward flange 134 of the blade 104 is disposed. Similarly, the aft retainer 166 includes an arm 172 inward of the aft flange 136. The arm 172 of the aft retainer 166 defines a lip 174 on which the aft flange 136 is disposed. The forward and aft retainers 164, 166 thereby help retain the blade 104 axially and radially with respect to the outer rotor 102. As previously stated, in various embodiments, the first rotor assembly 100 includes a plurality of blade or airfoils 104 in adjacent circumferential arrangement. It will be appreciated that, in such embodiments, each blade 104 includes forward and aft flanges 134, 136, and each forward flange 134 is disposed on the lip 170 defined by the arm 168 of the forward retainer 164, which each aft flange 136 is disposed on the lip 174 defined by the arm 172 of the aft retainer 166.

Referring now to FIGS. 6A, 6B, and 7, in other exemplary embodiments of the present subject matter, the first rotor assembly 100 utilizes other configurations to attach or couple the blades 104 to the outer rotor 102, such as a pin and clevis type arrangement. In the exemplary embodiment shown in FIGS. 6A, 6B, and 7, the plurality of CMC plies 138 forming the blade 104 are continuous plies 140 that wrap from the pressure side 120 to the suction side 122 of the blade 104 around a cylindrical loop 176 of plies 138 that is centered on the axial midline 142 of the blade root 116. More specifically, the loop 176 is formed from plies 138 such that the fibers within the plies are oriented in a substantially continuous ring about the midline 142. The plurality of continuous plies 140 forming the blade 104 are wrapped around the loop 176 located at the blade root 116 and extending along the midline 142, forming a generally teardrop shaped opening around the loop 176 into which one or more filler or ply packs 144 (which also may be referred to as noodles) are placed. As such, the blade root 116 has a generally bulbous shape.

In addition, as depicted in FIG. 6A, a pin 178 extends through the loop 176 and, therefore, through the blade root 116. Filler material such as filler or ply packs 144 is inserted between the pin 178 and the loop 176, and between the loop 176 and the continuous plies 140, to fill any gaps in the blade 104. In alternative embodiments, the filler packs 144 may be inserted within the teardrop-shaped opening between the loop 176 and the plies 140 and within the loop 176, and a pin hole 179 machined in the filler packs 144 such that the pin 178 is inserted after the filler packs 144 are placed within the pocket formed by the plies 140. Thus, the pin hole 179 is shaped complementary to the cross-section of the pin 178, and the filler packs 144 defining the pin hole 179 include a first pin surface and a second pin surface that interface with the first surface 180 and second surface 182 of the pin 178. In some embodiments, the pin hole 179 may be roughly defined by green machining as described above, e.g., after compaction and curing, and defined with the required tolerances by machining after the blade 104 has been fully processed, i.e., after firing and densification as described herein. In other embodiments, the pin hole 179 may be defined only by machining after processing, i.e., the blade 104 need not be green machined to define the pin hole 179. As shown in FIG. 6A, similar to the embodiment illustrated in FIG. 3, the continuous plies 140 form a generally teardrop-shaped pocket as the plies 140 wrap around the loop 176, and the filler packs 144 fill in the portions of the teardrop-shaped pocket not occupied by the loop 176 and pin 178. Further, the pin 178 may be made from any suitable material, such as a material having an appropriate shear strength. Generally, metal alloys typically used to fabricate rotor disks, e.g., Rene 108, an alloy within its family, or another suitable alloy, may be appropriate materials for the fabrication of the pin 178, but other materials may be used as well.

Keeping with FIG. 6A, the pin 178 defines two planar surfaces or flats for interfacing with the blade 104. As illustrated, the pin 178 defines a first pin surface 180 and a second pin surface 182 that each extend from an edge 184 such that an angle $\gamma$ is defined between the first and second pin surfaces 180, 182. In exemplary embodiments, the angle $\gamma$ is an obtuse angle. Further, like the first and second end surfaces 148, 150 described with respect to the embodiments of FIGS. 3 and 4, the first and second pin surfaces 180, 182 bear the loads experienced by the blade 104 and transfer the loads to the outer rotor 102. That is, the chisel-shaped, wedge-shaped, or pointed pin 178, with first and second pin surfaces 180, 182 extending parallel to complementary surfaces 192, 194 of the blade 104 contacted by the first and second pin surfaces 180, 182, helps the blade 104 withstand the compressive forces on the blade 104 at the contact surfaces between the blade 104 and outer rotor 102. Moreover, preserving the continuous plies 140 wrapped around the midline 142 helps protect against delaminations of the composite blade 104. As further shown in FIGS. 6A and 6B, the remainder of the pin 178 has a generally circular cross-section, i.e., the planar pin surfaces 180, 182 are defined on the generally circular cross-section of a body 177 of the pin 178 that is in contact with the blade 104 such that the surfaces 180, 182 comprise only a portion of the pin 178. Additionally, the first and second pin surfaces 180, 182 are oriented such that the chisel, wedge, or point formed by the pin 178 points radially inward, toward the tip 118 of the airfoil 104, unlike the first and second end surfaces 148, 150 of the embodiments of FIGS. 3 and 4, which form a chisel-shaped, wedge-shaped, or pointed end 132 that points radially outward. Thus, the remainder of the pin 178 over the pin body 177, i.e., the generally circular portion of the pin 178 over the body 177, is oriented radially outward with respect to the first and second pin surfaces 180, 182.

Referring to FIG. 7, the outer rotor 102 includes a forward flange 184 and an aft flange 186, with a groove 188 defined therebetween for receipt of the blade root 116. As shown in FIG. 6A, the groove 188 is shaped complementary to the root end 132. Each of the forward flange 184 and aft flange 186 defines an aperture 190 for receipt of the pin 178. Each aperture 190 is shaped complementary to the pin 178. As shown in FIG. 6B, which provides end views of a first end 196 and a second end 198 of the pin 178, as well as a side view of the pin 178, the first end 196 of the pin 178 defines a head that has a larger cross-section that the remainder of the pin 178. The first end 196 may have a generally circular cross-sectional shape, although a generally planar surface may be defined thereon. The forward aperture 190 may have a shape and size corresponding to the cross-sectional shape and size of the first end 196, with the planar surface of the first end 196 preventing pin 110 from rotating in the aperture 190; that is, the planar surface prevents the blade 104 from rotating with respect to the outer rotor 102. Such positional constraint is not possible with a pin with a circular cross-section received within a circular aperture. Further, it will be readily understood that variations of the shape of the first end 196 of pin 178 also may be used to prevent the rotation of the pin 178 and blade 104 and thereby hold constant the position of the blade 104. Further, the second end 198 of the pin 178 has a generally circular cross-section that is smaller than the cross-section of the remainder of the pin 178. As such, the second end 198 can easily pass through the pin hole 179, and the aft aperture 190 has a generally circular cross-section that is close in size to the cross-section of the second end 198, i.e., smaller than the cross-section of the forward aperture 190.

Thus, the blade 104 is retained radially and axially in the groove 188 of the outer rotor 102 by the pin 178 extending through the blade root 116. Moreover, as described herein with respect to other embodiments, in exemplary embodiments the first rotor assembly 100 depicted in FIGS. 6A and 7 includes a plurality of outer rotor airfoils or blades 104 in adjacent circumferential arrangement, with a pin 178 extending through the root 116 of each airfoil or blade 104 and into the forward and aft flanges 184, 186 of the outer rotor 102 to couple each airfoil or blade 104 to the outer rotor 102. As illustrated in FIG. 7, a split ring retainer 199, or other suitable retainer, may be used to retain the plurality of pins 178 with respect to the outer drum 102.

As described herein, the outer rotor airfoils or blades 104 are formed from a composite material such as a CMC material, and the present subject matter encompasses methods for forming the blades 104. For example, referring to FIG. 8, an exemplary method 800 for forming a blade 104 as described with respect to FIG. 3 comprises laying up a plurality of plies of the composite material, e.g., a plurality of CMC plies 138 as described with respect to the exemplary embodiments, as shown at 802 in FIG. 8. The plies 138 may be wrapped around a tool or mandrel that extends along the midline 142 such that at least a portion of the plies 138 are continuous plies 140 that wrap from the pressure side 120 to the suction side 122 of the blade 140. Further, as shown at 804, a plurality of machine stock or sacrificial plies 158 are laid up around the continuous plies 140 at the blade root 116; the machine stock plies 158 build up the blade root 116 to provide machine stock for machining the root 116 without cutting into the continuous plies 140. Laying up the plies 138 as described with respect to 802 and 804 in FIG. 8 also includes inserting filler packs 144 within any gaps, such as within the teardrop-shaped pocket formed by wrapping the continuous plies 140 about the midline 142.

Next, as illustrated at 806 and 808 in FIG. 8, the blade layup is processed and machined to define the first and second end surfaces 148, 150 on the composite blade 104, as previously described with respect to FIG. 3. For example, processing may include debulking and curing the blade layup to form an autoclaved body. Specific processing techniques and parameters for the process will depend on the particular composition of the materials. In embodiments in which the composite material is a CMC material, the autoclaved body then may undergo firing (or burn-off) to form a fired body, followed by densification to produce a densified CMC component that is a single piece component, i.e., the component is a continuous piece of CMC material. For instance, after autoclaving, the component may be placed in a furnace to burn off any mandrel-forming materials and/or solvents used in forming the CMC plies and to decompose binders in the solvents, and then placed in a furnace with silicon to convert a ceramic matrix precursor of the plies into the ceramic material of the matrix of the CMC component. The silicon melts and infiltrates any porosity created with the matrix as a result of the decomposition of the binder during burn-off/firing; the melt infiltration of the CMC component with silicon densifies the CMC component. In one embodiment, densification and firing may be conducted in a vacuum furnace or an inert atmosphere having an established atmosphere at temperatures above 1200° C. to allow silicon or another appropriate material or materials to melt-infiltrate into the component.

However, densification may be performed using any known densification technique including, but not limited to, Silcomp, melt-infiltration (MI), chemical vapor infiltration (CVI), polymer infiltration and pyrolysis (PIP), and oxide/oxide processes. For example, silicon CMC components may be formed from fibrous material that is infiltrated with molten silicon, e.g., through a process typically referred to as the Silcomp process. Another technique of manufacturing CMC components is the method known as the slurry cast MI process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by a tool during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Optionally, after processing and machining in the first and second end surfaces 148, 150, the composite component may be finish machined, if and as needed, and coated with one or more coatings, such as an environmental barrier coating (EBC), as illustrated at 810 in FIG. 8. Finish machining may include removing any accumulations of infiltration material from an outer surface of the blade 104, refining functional or critical features (including critical dimensions) of the blade 104, etc. Further, as described with respect to FIG. 3, in some embodiments, the first and second end surfaces 148, 150 may be roughly defined on the blade layup after partially processing the layup, e.g., after compacting and curing the layup but before firing and densification, and then fully or finally defined (i.e., having the required tolerances) after firing and densification.

Referring now to FIG. 9, an exemplary method 900 for forming a blade 104 as described with respect to FIG. 4 comprises laying up a plurality of plies of the composite material, e.g., a plurality of CMC plies 138 as described with respect to the exemplary embodiments, as shown at 902 in FIG. 9. The plies 138 are laid up such that the plies 138 are continuous along the span of the blade 104 (and therefore may be referred to as continuous plies 140) but do not wrap around the blade root 116. Laying up the plies 138 as described with respect to 902 in FIG. 9 also includes inserting filler packs 144 or a filler material to build up the blade root 116 as described above with respect to FIG. 4.

Next, as illustrated at 904 in FIG. 9, the blade layup is partially processed to form a green state layup or blade, as described above. As shown at 906, the green state layup is machined in its green state, i.e., green machined, to define the first and second surfaces 132a, 132b, as previously described with respect to FIG. 4. After green machining, as depicted at 908 in FIG. 9, the end surface plies 160, e.g., a laminate of CMC plies 138, are laid up with the green state layup or blade to define the first end surface 148 and second end surface 150. Then, as shown at 910 and 912, the green state layup (comprising the partially processed continuous plies 140) and the end surface plies 160 are processed to form the composite component, i.e., blade 104, and optionally finish machined and coated, e.g., as described above with respect to method 800. For example, processing may include debulking and curing the green state layup and end surface plies 160, followed by firing and densification, then finish machining and coating if and as needed. It will be appreciated that processing the green state layup and the end surface plies 160 melds the end surface plies 160 with the continuous plies 140 to form a single piece blade 104.

Turning to FIG. 10, an exemplary method 1000 for forming a blade 104 as described with respect to FIG. 6A comprises laying up a plurality of plies of the composite material, e.g., a plurality of CMC plies 138 as described with respect to the exemplary embodiments, as shown at 1002 in FIG. 10. First, a portion of the plies 138 may be used to form the continuous loop 176, e.g., by wrapping the plies around a tool or mandrel to form the loop 176. Then, another portion of the plies 138 may be wrapped around the loop 176, e.g., as the loop 176 is supported on the tool or mandrel, such that at least a portion of the plies 138 are continuous plies 140 that wrap from the pressure side 120 to the suction side 122 of the blade 140. Next, as shown at 1004, filler material, such as one or more filler or ply packs 144, is inserted to fill any gaps in the pocket formed by wrapping the continuous plies 140 around the loop 176, e.g., any gaps between the loop 176 and the continuous plies 140 to fill in the teardrop-shaped pocket as shown in FIG. 6A.

Next, as illustrated at 1006 and 1008 in FIG. 10, the blade layup is processed to form the composite component and machined to define a hole 179 for receipt of the pin 178 in the blade root 116, as previously described with respect to FIG. 6A. In some embodiments, after machining, the pin 178 may be inserted such that it extends through the blade root 116 and projects from the forward end and aft end of the blade 104 for receipt in the forward and aft flanges 184, 186 of the outer rotor 102. In other embodiments, the pin 178 may be inserted during installation of the blade 104 in the first rotor assembly 100. As shown at 1010, the blade 104 is optionally finish machined and coated, e.g., as described above with respect to method 800. For example, the blade layup may be processed by debulking and curing, followed by firing and densification, then machined to define pin hole 179, and finally finish machined and coated if and as needed. In some embodiments, the blade layup may be debulked and cured, machined to roughly define the pin hole 179, fired and densified, machined to fully and finally define the pin hole 179 (i.e., to define the pin hole 179 with the required tolerances), and then, if and as needed, finish machined and coated.

Of course, the methods described with respect to FIGS. 8, 9, and 10 are provided by way of example only. As an example, other known methods or techniques for compacting and/or curing composite plies, as well as for densifying a composite component, may be utilized. Alternatively, any combinations of these or other known processes may be used. Further, although FIGS. 2-7 depict a blade 104 of the outer rotor 102 of a co- or counter-rotating turbine as an exemplary composite component formed using the foregoing methods, the methods described herein also may be used to form other composite components. For instance, the composite component may be an airfoil of a co- or counter-rotating compressor or any other suitable airfoil of a gas turbine engine. Further, although the structures and methods are described herein with respect to ceramic matrix composite materials, it will be appreciated that in other embodiments, any suitable composite material may be used.

In regard to the embodiments of the first rotor or airfoil assembly 100 generally shown and described herein as a portion of the turbine section 30, the embodiments generally provided herein may improve existing interdigitated or counter-rotating turbine sections by enabling improved fuel efficiency, operational efficiency, and/or power output while maintaining or reducing weight, part count, and/or packaging. The plurality of outer rotor airfoils or blades 104 of the first rotor assembly 100 interdigitated among the plurality of second airfoils or blades 202 of the second rotor assembly 200 may reduce packaging (e.g., longitudinal and/or radial dimensions) and reduce part count by removing stages of stationary airfoils between each rotating component. Further, interdigitation as described herein may reduce a product of a flow area and the square of the rotational speed (the product herein referred to as "$AN^2$") of the gas turbine engine. For example, the engine 10 shown and described herein may generally reduce $AN^2$ relative to a conventional geared turbofan configuration. Generally, lowering the $AN^2$, such as by reducing the rotational speed and/or the flow area, increases the required average stage work factor (i.e., the average required loading on each stage of rotating airfoils). However, the systems described herein may lower the $AN^2$ while also lowering the average stage work factor and maintaining axial length of the turbine section 30 (compared to engines of similar thrust output and packaging) by interdigitating the first rotor assembly 100 defining a low speed turbine among the one or more stages of the second rotor assembly 200 defining a high speed turbine. Therefore, the first rotor assembly 100 may increase the quantity of rotating stages of airfoils while reducing the average stage work factor, and therefore the $AN^2$, while mitigating increases in axial length to produce a similar $AN^2$ value. The first rotor assembly 100 may further reduce the $AN^2$ while additionally reducing the overall quantity of airfoils, rotating and stationary, in the turbine section 30 relative to turbine sections of gas turbine engines of similar power output and/or packaging.

Still further, the composite airfoils or blades 104 described herein allow increased engine temperatures, which may increase engine performance. Moreover, the composite blades 104 are attached to the outer rotor 102 such that the blade 104 are in compression rather than tension, and the blades 104 include features, such as the continuous plies 140, pressure surfaces 148, 150 of the blade 104, and pressure surfaces 180, 182 of the pin 178, for resisting or minimizing the impact of compressive loading of the airfoils. For instance, the blades 104 of the embodiments of FIGS. 3 and 6 having continuous plies 140 that wrap from one side of the blade 104 to the other are more robust to compressive loading than the blades 104 of the embodiment of FIG. 4, although all of the blades 104 described herein include features for minimizing the compressive loads at the point or points of attachment to the outer rotor 102. Moreover, in at least some embodiments described herein, the configuration of the blade root 116 for attaching to the outer rotor 102 minimizes the depth of the outer rotor groove 152 in which the blade root 116 is received, which helps reduce the weight of the rotor assembly 100, as well as the attachment stress concentrations. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A rotor assembly for a gas turbine engine, comprising:
a rotary structure extending circumferentially about an axial centerline of the gas turbine engine, the rotary structure including a forward flange and an aft flange;
an airfoil having a root and a tip, the root coupled to the rotary structure and having a bulbous shape, the airfoil formed from a plurality of plies of a composite material; and
a pin extending through the root, the pin defining both a planar first surface and a planar second surface on a pin body having a generally circular cross-section, the pin including a first end and a second end,
wherein the first end and the second end contact the rotary structure,
wherein the first surface and the second surface together form a point that is oriented toward the tip of the airfoil,
wherein a groove is defined between the forward flange and aft flange for receipt of the root, and
wherein each of the forward flange and the aft flange defines an aperture for receipt of the pin such that the first end of the pin contacts the forward flange and the second end of the pin contacts the aft flange.

2. The rotor assembly of claim 1, further comprising:
a cylindrical loop formed from plies of the composite material,
wherein the plurality of plies forming the airfoil are continuous plies that wrap around the loop, and
wherein the pin extends through the loop.

3. The rotor assembly of claim 2, wherein the loop is centered on and extends along a midline of the root,
wherein the continuous plies comprise a plurality of fibers, and
wherein the fibers within the continuous plies forming the loop are oriented in a continuous ring about the midline.

4. The rotor assembly of claim 1, wherein the rotary structure is a counter-rotating outer rotor of an interdigitated rotor assembly.

5. A rotor assembly for a gas turbine engine, comprising:
an outer rotor extending circumferentially about an axial centerline of the gas turbine engine, the outer rotor including a forward flange and an aft flange;
an outer rotor blade having a blade root and a blade tip, the blade root coupled to the outer rotor, the outer rotor blade extending inward along a radial direction toward the axial centerline, the outer rotor blade formed from a plurality of plies of a composite material; and
a pin extending through the blade root, the pin defining both a planar first surface and a planar second surface on a pin body having generally circular cross-section, the pin including a first end and a second end,
wherein the first end and the second end contact the outer rotor,
wherein the first surface and the second surface together form a point that is oriented toward the blade tip,
wherein a groove is defined between the forward flange and aft flange for receipt of the blade root, and
wherein each of the forward flange and the aft flange defines an aperture for receipt of the pin such that the first end of the pin contacts the forward flange and the second end of the pin contacts the aft flange.

6. The rotor assembly of claim 5, wherein the first end of the pin defines a head having a planar surface and a cross-section that is larger than a cross-section of the pin body,
wherein the aperture of the forward flange is a shape and size complementary to the head of the first end of the pin,
wherein the second end of the pin has a circular cross-section that is smaller than the cross-section of the pin body, and
wherein the aperture of the aft flange is a shape and size complementary to the second end.

7. The rotor assembly of claim 5, wherein an obtuse angle is defined between the first surface and the second surface of the pin.

8. The rotor assembly of claim 5, further comprising:
a cylindrical loop formed from plies of the composite material,
wherein the plurality of plies forming the outer rotor blade are continuous plies that wrap around the loop, and
wherein the pin extends through the loop.

9. The rotor assembly of claim 8, wherein the loop is centered on and extends along a midline of the blade root.

10. The rotor assembly of claim 8, wherein the continuous plies comprise a plurality of fibers, and
wherein the fibers within the continuous plies forming the loop are oriented in a continuous ring about a midline of the blade root.

11. The rotor assembly of claim 8, further comprising:
filler material inserted within gaps at the blade root, the filler material filling gaps between the loop, the pin, and the plies forming the outer rotor blade.

12. The rotor assembly of claim 11, wherein the pin is received within a pin hole defined in the filler material.

13. The rotor assembly of claim 8, wherein the continuous plies forming the outer rotor blade wrap around the loop, forming a teardrop shaped opening around the loop and a bulbous shaped blade root.

14. The rotor assembly of claim 5, further comprising:
a plurality of outer rotor blades;
an inner rotor extending along the axial centerline; and
a plurality of inner rotor blades, each inner rotor blade having an inner blade root and an inner blade tip, the inner blade root coupled to the inner rotor, the inner rotor blade extending outward along the radial direction away from the axial centerline,
wherein the plurality of inner rotor blades are interdigitated with the plurality of outer rotor blades.

15. The rotor assembly of claim 5, wherein the composite material is a ceramic matrix composite.

16. A method for manufacturing a blade for an outer rotor of an interdigitated rotor assembly, the method comprising:
wrapping a plurality of plies of a composite material around a loop of the composite material;
inserting a first filler material within gaps between the plurality of plies and the loop;
inserting a second filler material within the loop;
processing the plurality of plies and the loop to produce the blade; and
defining a pin hole in the second filler material within the loop, the pin hole defined in a blade root of the blade.

17. The method of claim 16, further comprising:
inserting a pin within the pin hole, the pin defining both a planar first surface and a planar second surface on a pin body that has a generally circular cross-section,
wherein the blade has a blade tip opposite the blade root,
wherein the loop is located at the blade root, and
wherein the first surface and the second surface of the pin together form a point that is oriented toward the blade tip.

18. The method of claim 16, further comprising:
forming the loop from a second plurality of plies of the composite material,
wherein the second plurality of plies are continuous plies comprising a plurality of fibers, and
wherein the fibers within the second plurality of plies are oriented in a continuous ring.

\* \* \* \* \*